(12) United States Patent
Mizobuchi (10) Patent No.: US 12,267,578 B2
(45) Date of Patent: Apr. 1, 2025

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventor: Yasuhiro Mizobuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 18/185,299

(22) Filed: Mar. 16, 2023

(65) Prior Publication Data

US 2023/0308745 A1 Sep. 28, 2023

(30) Foreign Application Priority Data

Mar. 23, 2022 (JP) ................. 2022-047112

(51) Int. Cl.
| | |
|---|---|
| H04N 23/61 | (2023.01) |
| H04N 23/60 | (2023.01) |
| H04N 23/611 | (2023.01) |
| H04N 23/65 | (2023.01) |
| H04N 23/67 | (2023.01) |
| H04N 23/695 | (2023.01) |

(52) U.S. Cl.
CPC ........... *H04N 23/64* (2023.01); *H04N 23/611* (2023.01); *H04N 23/651* (2023.01); *H04N 23/67* (2023.01); *H04N 23/695* (2023.01)

(58) Field of Classification Search
None
See application file for complete search history.

(56) References Cited

U.S. PATENT DOCUMENTS

| | | | | |
|---|---|---|---|---|
| 9,712,735 | B2 * | 7/2017 | Yoshizumi | H04N 23/61 |
| 10,582,117 | B1 * | 3/2020 | Tanaka | G06F 3/013 |
| 11,128,636 | B1 * | 9/2021 | Jorasch | G06F 3/0346 |
| 2007/0025722 | A1 * | 2/2007 | Matsugu | G03B 17/16 |
| | | | | 348/E5.042 |
| 2013/0216199 | A1 * | 8/2013 | Nakajima | H04N 23/951 |
| | | | | 348/349 |
| 2016/0127641 | A1 * | 5/2016 | Gove | H04N 23/611 |
| | | | | 348/143 |
| 2017/0272644 | A1 * | 9/2017 | Chou | H04N 7/181 |
| 2018/0107999 | A1 * | 4/2018 | Rizzolo | H04N 23/90 |
| 2019/0132522 | A1 * | 5/2019 | Tsubusaki | H04N 23/6812 |
| 2021/0237264 | A1 * | 8/2021 | Altaras | H04N 23/61 |
| 2022/0038620 | A1 * | 2/2022 | Demers | G06V 10/764 |
| 2022/0179187 | A1 * | 6/2022 | Harfouche | G02B 26/08 |
| 2022/0360718 | A1 * | 11/2022 | Choffat | G06T 7/20 |
| 2023/0098779 | A1 * | 3/2023 | Mankowski | G06V 20/58 |
| | | | | 340/425.5 |
| 2023/0171484 | A1 * | 6/2023 | Dedonato | G06F 1/1686 |

(Continued)

FOREIGN PATENT DOCUMENTS

JP 3897087 B2 3/2007

*Primary Examiner* — Reza Aghevli
(74) *Attorney, Agent, or Firm* — Canon U.S.A., Inc., IP Division (57) ABSTRACT

A control apparatus includes a search unit that performs object search using image data that has been acquired from an image pickup apparatus and a control unit that controls the search unit. The control unit controls a focal length of the image pickup apparatus according to a specified search distance in a search distance range in which the object search is available, and a size of a search target object.

13 Claims, 8 Drawing Sheets

(56) References Cited

U.S. PATENT DOCUMENTS

| | | | | |
|---|---|---|---|---|
| 2023/0336865 A1* | 10/2023 | Da Veiga | ............... | H04N 23/64 |
| 2023/0359204 A1* | 11/2023 | Qin | ........................ | H04N 23/64 |
| 2023/0418131 A1* | 12/2023 | Aiba | ...................... | H04N 23/67 |
| 2024/0156325 A1* | 5/2024 | Levine | ............. | A61B 1/000096 |

* cited by examiner

| No. | SHORT | | MIDDLE | | LONG | |
|---|---|---|---|---|---|---|
| | SEARCH DISTANCE [m] | SEARCH TIME [min] | SEARCH DISTANCE [m] | SEARCH TIME [min] | SEARCH DISTANCE [m] | SEARCH TIME [min] |
| 1 | 1.2 | 10 | 4 | 10 | 9 | 10 |
| 2 | 1.8 | 8 | 2.7 | 8 | 6 | 8 |
| 3 | 2.7 | 6 | 6 | 6 | 4 | 6 |
| 4 | 4 | 4 | 1.8 | 4 | 2.7 | 4 |
| 5 | 6 | 2 | 9 | 2 | 1.8 | 2 |
| 6 | 9 | 1 | 1.2 | 1 | 1.2 | 1 |

FIG. 11

| SEARCH DISTANCE [m] | 1.2 | 1.8 | 2.7 | 4 | 6 | 9 |
|---|---|---|---|---|---|---|
| PAN DRIVING AMOUNT [deg] | 34.2 | 23.5 | 15.8 | 10.7 | 7.2 | 4.8 |
| TILT DRIVING AMOUNT [deg] | 17.5 | 11.8 | 8.0 | 5.4 | 3.6 | 2.4 |
| PAN SEARCH RANGE [deg] | ±180 | ±180 | ±180 | ±120 | ±90 | ±60 |
| TILT SEARCH RANGE [deg] | 0~80 | 0~80 | 0~80 | 0~60 | 0~40 | 0~30 |

CONTROL APPARATUS, IMAGE PICKUP APPARATUS, CONTROL METHOD, AND STORAGE MEDIUM

BACKGROUND

Technical Field

One of the aspects of the disclosure relates to the technology of searching for an object using image data acquired by imaging.

Description of the Related Art

An automatic image pickup apparatus has been proposed that periodically and continuously captures images without imaging instructions from a user. For example, a lifelog camera is attached to the body of the user with a strap or the like and records images of scenes that the user views in his daily life at regular time intervals. Another camera performs automatic imaging by recognizing human faces such as smiling faces and sudden movements of animals such as dogs and cats. Still another camera includes a Pan/Tilt/Zoom (PTZ) control mechanism and automatically captures images by freely changing an imaging range.

Another proposed camera enables the user to previously register and specify an object (priority object) to be preferentially searched for and captured. In searching for the priority object, an object outside the angle of view may be searched for, and a distance direction from the camera may be searched so as to search for a proper priority object from nearby and distant objects.

A method using feature points extracted from an image and a method using pattern matching are commonly used to detect a specific object. These object detecting methods need to keep an object size on an image within a certain range. Thus, in detecting from a distant object to a nearby object, it is necessary to acquire images and to perform detection processing according to different distances by changing a focal length of a camera or by cutting out and enlarging part of the image. As a result, it takes a long time to complete detection processing in the entire search range. If the object distance to be captured (or imaged) is determined, the detection processing in the entire search range takes a long time to detect the object to be captured and may cause a photo opportunity to be missed.

Japanese Patent No. 3897087 discloses a method for detecting an object in a short time by limiting a distance range for object detection using distance distribution information for each area (partial image) in an image that has been acquired by imaging.

However, the method disclosed in Japanese Patent No. 3897087 cannot shorten the detection time for an object outside the angle of view when applied to a camera such as the PTZ camera that searches for an object in a wide search range while changing a camera orientation.

SUMMARY

One of the aspects of the embodiment provides a control apparatus that can detect an object within a search range in a short time.

A control apparatus according to one aspect of the disclosure includes at least one processor and a memory coupled to the at least one processor. The memory storing instructions that, when executed by the processor, configure the at least one processor to operate as a search unit configured to perform object searching using image data that has been acquired from an image pickup apparatus, and a control unit configured to control the search unit by controlling a focal length of the image pickup apparatus according to a specified search distance in a search distance range where the object search is available, and a size of a search target object. An image pickup apparatus having the above control apparatus, and a control method corresponding to the above control apparatus also constitute another aspect of the disclosure. A non-transitory computer-readable storage medium storing a program for causing a computer to execute the above control method also constitutes another aspect of the disclosure.

DESCRIPTION OF THE EMBODIMENTS

Referring now to the accompanying drawings, a description will be given of embodiments according to the disclosure.

First Embodiment

A first embodiment will discuss an automatic camera (image pickup apparatus) that limits a search distance of an object to be captured.

The camera according to this embodiment is a digital camera that can provide PTZ control. This camera is used in various imaging situations, such as setting the camera on a dining table to capture a person eating a meal, and setting the camera in a park to capture children playing from a distance such as over a bench. At this time, a distance between the camera and an object to be captured (referred to as a specific object hereinafter) changes depending on imaging conditions. In a case where the camera thoroughly searches an imagable range, it may miss a photo opportunity of the specific object during searching of an area where the specific object does not exist.

Thus, the camera according to this embodiment enables the user to specify a search distance. The camera calculates a focal length suitable to recognize a face at the specified search distance (referred to as specified distance hereinafter) based on the specified distance and an average size of a human face as a search target object (object to be searched for). In searching for an object, the focal length is used for imaging and object determination (identification). Thereby, automatic imaging can be made without missing a photo opportunity for the object at the position intended by the user.

Figure 1A:
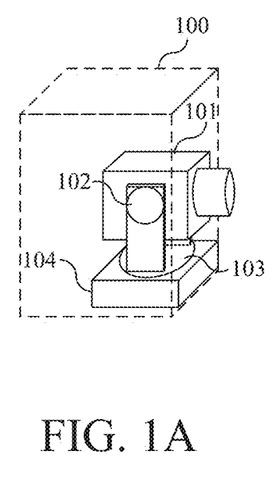
FIGS. 1A and 1B illustrate the configuration and rotation axes of each of image pickup apparatuses according to first and second embodiments.

FIG. 1A illustrates a camera 100 according to this embodiment. The camera 100 includes an imaging unit 101 configured to capture an image, a tilting unit 102 configured to drive the imaging unit 101 in a tilt direction, a panning unit 103 configured to drive the imaging unit 101 in a pan direction, and a main box 104a that houses a control unit configured to control imaging and the like. The tilting unit 102 and panning unit 103 function as a direction changing unit that changes the imaging direction of the imaging unit 101.

Figure 2:
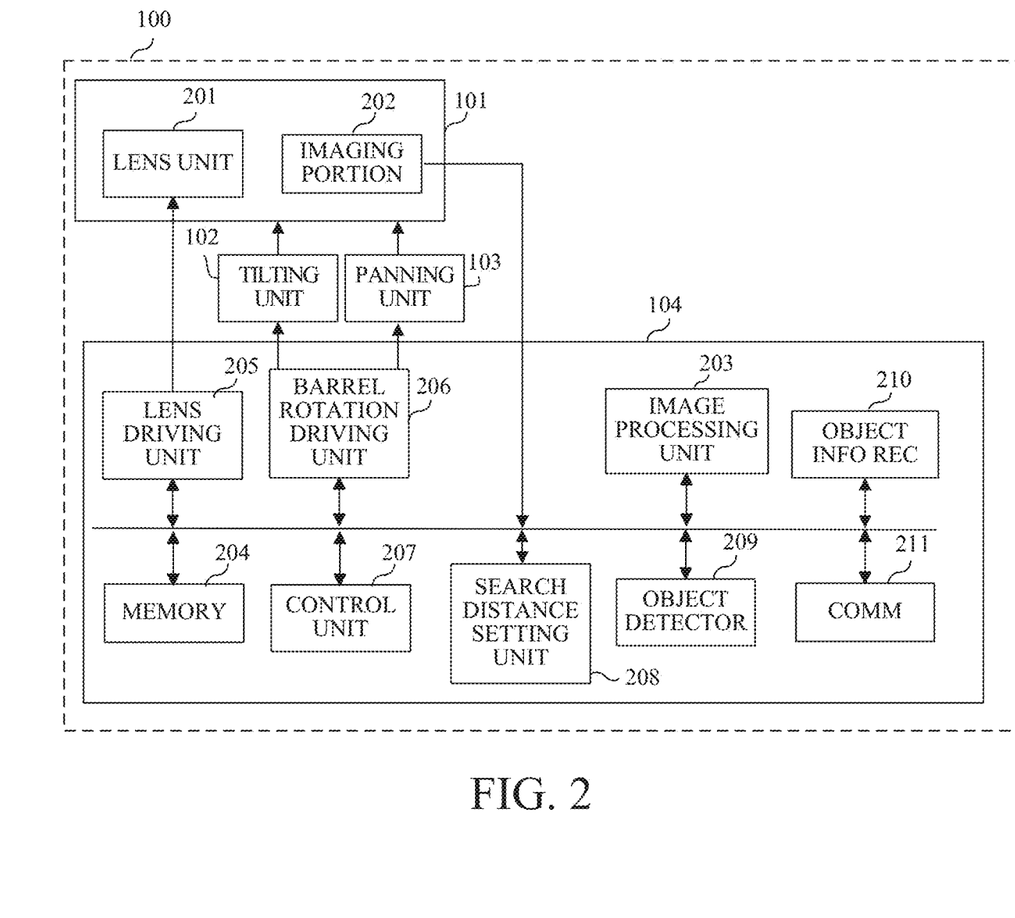
FIG. 2 is a block diagram illustrating the configuration of each of the image pickup apparatuses according to the first and second embodiments.

FIG. 2 illustrates the internal configuration of the camera 100. The imaging unit 101 includes a lens unit 201 as an imaging optical system, and an imaging portion 202 including an image sensor configured to photoelectrically convert (image) an object image formed by light from the lens unit 201. The imaging portion 202 further includes an analog-to-digital (A/D) converter configured to convert an analog imaging signal output from the image sensor into a digital imaging signal (imaging data). The imaging unit 101 is held by the main box 104 via the tilting unit 102 and the panning unit 103.

Figure 1B:
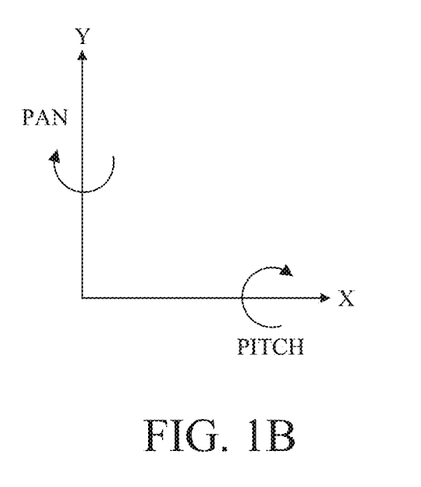

The tilting unit 102 includes a tilt motor as an actuator, and a rotation mechanism that rotates the imaging unit 101 in the pitch direction illustrated in FIG. 1B by the tilt motor. The panning unit 103 includes a pan motor as an actuator, and a rotation mechanism that rotates the imaging unit 101 in the pan direction illustrated in FIG. 1B by the pan motor. The pitch direction is a rotation direction about the horizontal axis (X-axis) of the camera 100, and the pan direction is a rotation direction about the vertical axis (Y-axis) of the camera 100.

As illustrated in FIG. 2, the main box 104 houses a control unit 207 that controls zooming and focusing operations of the lens unit 201 in the imaging unit 101, imaging of the imaging portion 202, and driving of the tilting and panning units 102 and 103. The control unit 207 controls the operation of the lens unit 201 via the lens driving unit 205 and the driving of the tilting and panning units 102 and 103 via a barrel rotation driving unit 206.

An image processing unit 203, a memory 204, a search distance setting unit 208, an object detector 209, an object information recorder 210, and a communication unit 211 are provided inside the main box 104. The image processing unit 203 performs image processing such as distortion correction, white balance adjustment, and color interpolation processing for captured image data output from the imaging portion 202 to generate image data. The generated image data is output to the memory 204 and object detector 209.

The memory 204 converts the image data generated by the image processing unit 203 into a recording format such as JPEG or MPEG, and records it in a recording medium such as a nonvolatile memory. The memory 204 also records, as past imaging information, information on an imaged object (referred to as object information hereinafter) in association with the recorded image data.

The lens driving unit 205 includes motors for driving a zoom lens and a focus lens included in the lens unit 201 and drivers for driving the motors, and drives each lens based on a target position and driving speed input from the control unit 207. The barrel rotation driving unit 206 drives the tilting and panning units 102 and 103 based on the target position and driving speed input from the control unit 207, and rotates the imaging unit 101 in the tilt direction and the pan direction. Here, the target position and driving speed are specified as the input of the barrel rotation driving unit 206 and the output of the control unit 207, but acceleration, time-division data to the target position, etc. may be specified.

The control unit 207 executes a sequence for automatic imaging that does not need the user operation, in addition to controlling the operation and driving described above. More specifically, the control unit 207 executes a search sequence for detecting the object as an imaging target, a tracking sequence for keeping sight of the object detected by the search sequence, and an imaging sequence for adjusting the imaging composition and controlling the shutter timing, etc. The search sequence will be described below.

In the tracking sequence and the imaging sequence, the control unit 207 determines an object of the imaging target based on the object information input from the object detector 209, and target positions of the lens driving and barrel rotation driving for a proper imaging composition while maintaining the object within the imaging angle of view of the imaging unit 101. The control unit 207 outputs information on the determined target position to the lens driving unit 205 and the barrel rotation driving unit 206. The control unit 207 outputs instructions to start and end imaging to the memory 204 at proper timings.

The search distance setting unit 208 stores the specified distance input by the user. The specified distance is a distance from the camera 100, and is a specified search distance within a search distance range in which the object search is available. The specified distance is specified by the user via an image processing apparatus, which will be described below, and input to the search distance setting unit 208 via the communication unit 211. The specified distance is abstract in this embodiment, and is set to one of "short distance (short)," "middle distance (mid)," "long distance (long)," and "automatic (auto)" in this embodiment. The search distance setting unit 208 records the input specified distance and outputs the specified distance in response to a request from the control unit 207. As a measure to prevent the user from forgetting to set the search distance, the search distance setting unit 208 changes the search distance setting to an initial value a predetermined time after the specified distance is designated or use is terminated due to power shutdown.

The object detector 209 has a function of determining a face orientation of an object, a function of detecting a face position, a function of detecting a face size, a function of registering the object, and a function of uniquely identifying the registered object. The object detector 209 extracts object information (the size of the detected face, the position and orientation of the face in the image, the identification result of the registered object, etc.) from the face area of the image data input from the image processing unit 203, and output the object information to the control unit 207 and the object information recorder 210. A search unit includes the object detector 209, the search distance setting unit 208, and the control unit 207. A control apparatus includes the search unit, and the control unit 207 configured to control the search unit.

There is a limit to the face size on an image detectable by the object detector 209. For example, in a case where an object is captured at the edge or the entire surface of the captured image and part of the face is missing, the face cannot be accurately identified and may not be recognized as a face. In a case where the captured image is a VGA (640×480 pixels) image, in order to recognize it as a human face with high accuracy, an area from the top of the head to the chin may have a certain size, such as 160 to 360 pixels on the captured image.

The object information recorder 210 registers objects based on the object detection results input from the object detector 209. The object information recorder 210 stores the name, birthday, priority setting information, etc. for each object input from the communication unit 211 through a setting unit (user interface, etc.) of the object priority provided by the image processing apparatus, which will be described below, to the user. The object information recorder 210 outputs the priority setting information corresponding to the object to the control unit 207 according to the object detection result input from the object detector 209.

The communication unit 211 has a long-distance wireless communication function, and communicates with the image processing apparatus, which will be described below, by wireless communication. The communication unit 211 outputs the specified distance specified by the user via the image processing apparatus to the search distance setting unit 208 and outputs the name, birthday, and priority setting information for each object to the object information recorder 210.

Figure 3A:
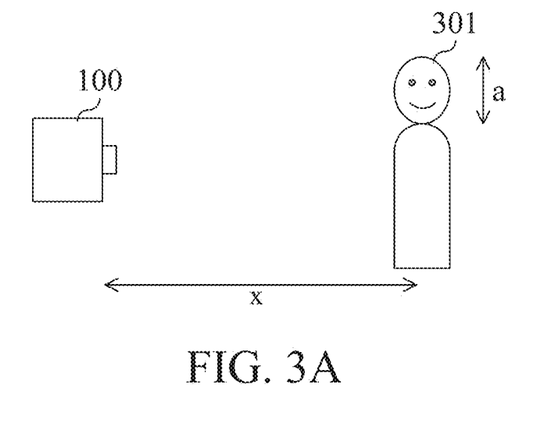
FIGS. 3A and 3B illustrate a relationship between each of the image pickup apparatuses according to the first and second embodiments and an object.
Figure 3B:
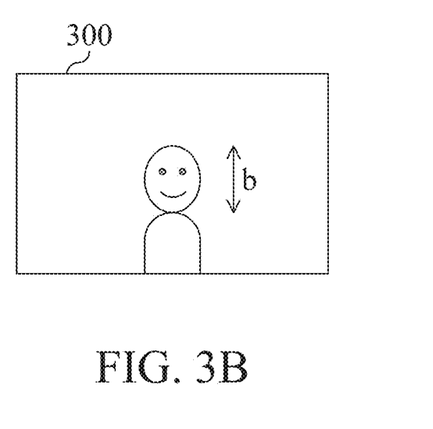

Referring now to FIGS. 3A and 3B, a description will be given of a positional relationship between the camera 100 and the object. A search distance x is a distance that is actually used for searching, and is a specific numerical value indicating a distance between the camera 100 and a search target object 301. The search distance x is determined by the control unit 207 based on the specified distance set by the search distance setting unit 208.

As illustrated in FIG. 3A, where "a" is an actual size of the search target object 301. The actual size "a" is a size corresponding to a representative value such as an average value or a median value of a length from the top of the head to the tip of the chin of a human face, and is assumed to be 23 cm here. As illustrated in FIG. 3B, "b" is a predetermined proper size of the search target object on an imaging plane 300 of the image sensor (referred to as imaging size hereinafter). As described above, the size "b" is about ⅓ to ¾ as long as the short side of the imaging plane 300 (that is, captured image).

The imaging size "b" is determined according to the detection rate of the object detector 209, the number of objects in the image, and the like. The imaging size "b" may be calculated based on the size of the search target object on the captured image and the optical parameter of the lens unit 201. A focal length "f" of the lens unit 201 can be calculated using "x," "a," and "b" as illustrated in Equation (1) below:

$$f = bx/a \quad (1)$$

The focal length "f" calculated by Equation (1) is used in a case where the control unit 207 executes the search sequence.

Figure 9:
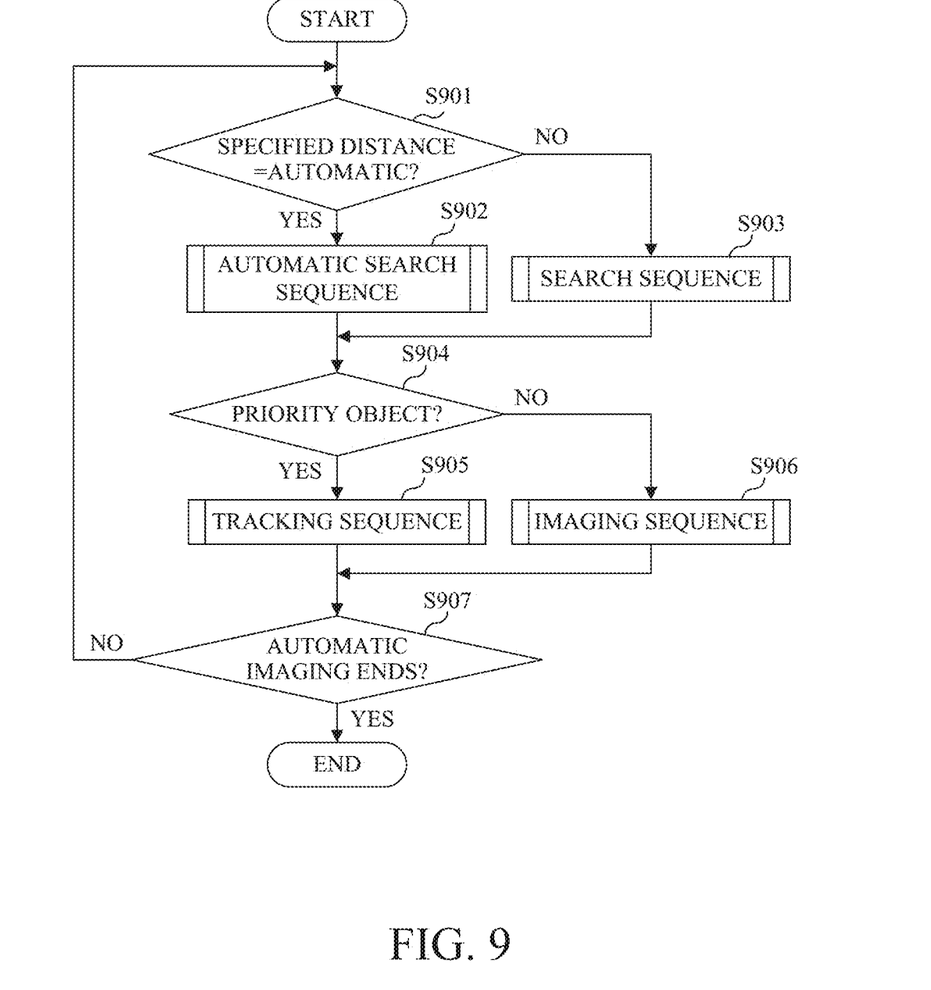
FIG. 9 is a flowchart illustrating an execution sequence in automatic imaging in the first and second embodiments.

A flowchart in FIG. 9 illustrates a series of automatic imaging processing from object search to imaging. The automatic imaging processing is divided into an automatic search sequence, a search sequence, a tracking sequence, and an imaging sequence, and the control unit 207 executes these sequences depending on situations. The control unit 207 as a computer executes this processing according to a computer program.

The control unit 207 starts the automatic imaging processing in response to the power-on of the camera or recovery from the sleep state. In step S901, the control unit 207 acquires the specified distance from the search distance setting unit 208 and determines whether "automatic" or another distance is selected. In a case where "automatic" is selected, an automatic search sequence is executed in step S902. In a case where "short distance," "middle distance," and "long distance," is selected, a search sequence is executed in step S903.

The search sequence (step S903), details of which will be described below, determines the search distance based on the specified distance and sequentially changes the pan and tilt angles to search for (detect) the object while scanning the search range as a spatial range. In a case where an object is detected by the search sequence, the control unit 207 stores the object information indicating whether the detected object is a priority object (specific object) or a non-priority object, and the flow proceeds to step S904. A priority object is a face of a specific person that is a target of preferential search and imaging among human faces as search target objects.

The automatic search sequence (step S902) is a sequence that detects an object while scanning the search range by sequentially changing the pan and tilt angles and zoom position without limiting the search distance. Similarly to the search sequence, the automatic search sequence stores object information indicating whether the detected object is a priority object or a non-priority object, and the flow proceeds to step S904.

In step S904, the control unit 207 determines based on the object information stored in step S902 or S903 whether the object detected in these steps is a priority object or a non-priority object. In a case where a priority object is detected, the flow proceeds to step S905 to execute the tracking sequence, and if a non-priority object is detected, the flow proceeds to step S906 to execute the imaging sequence.

The tracking sequence (step S905) is a sequence for tracking an object through PTZ driving so as to continue to keep sight of the object already captured within the imaging angle of view. The control unit 207 calculates the PTZ driving amounts so as to limit the object to be tracked to one and keep that object at the center of the imaging angle of view (captured image). More specifically, the control unit 207 calculates the pan and tilt driving amounts so as to cancel out the positional difference between the center of the captured image and the center of the object. The control unit 207 calculates the zoom driving amount so as to cancel out a difference between the actual object size and the ideal object size on the image (imaging screen). The ideal object size may be a size "b" of the object expected on the imaging plane 300 described with reference to FIG. 3B, or a size smaller than the size "b" to prevent poor tracking of a moving object.

In the tracking sequence, the control unit 207 determines whether or not to perform further imaging, and in a case where it is determined that imaging is to be performed, the flow proceeds to an illustrated imaging subsequence. The imaging subsequence performs processing similar to the imaging sequence in step S906, which will be described below, but when the imaging subsequence ends, the flow returns to the tracking sequence to resume tracking of the object. Thus, the tracking sequence is a sequence of tracking and imaging until the priority object cannot be tracked.

The imaging sequence (step S906) is a sequence for imaging the object detected in the preceding sequence. In the imaging sequence, the control unit 207 adjusts the composition based on the object information, performs imaging, outputs the captured image to the memory 204, and stores it in the recording medium. The composition is adjusted with the PTZ driving amounts calculated based on the number, positions, sizes, face orientations, etc. of objects on the captured image. The composition adjustment and imaging may be performed several times instead of once. In that case, the composition may be differently adjusted to image different compositions.

In a case where the tracking sequence or imaging sequence S906 ends, in step S907 the control unit 207 determines whether or not to end the automatic imaging based on the number of imaging times, power consumption, and the like. In a case where the automatic imaging is to be continued, the flow returns to step S901, and if the automatic imaging is to be terminated, the flow ends.

Figure 4:
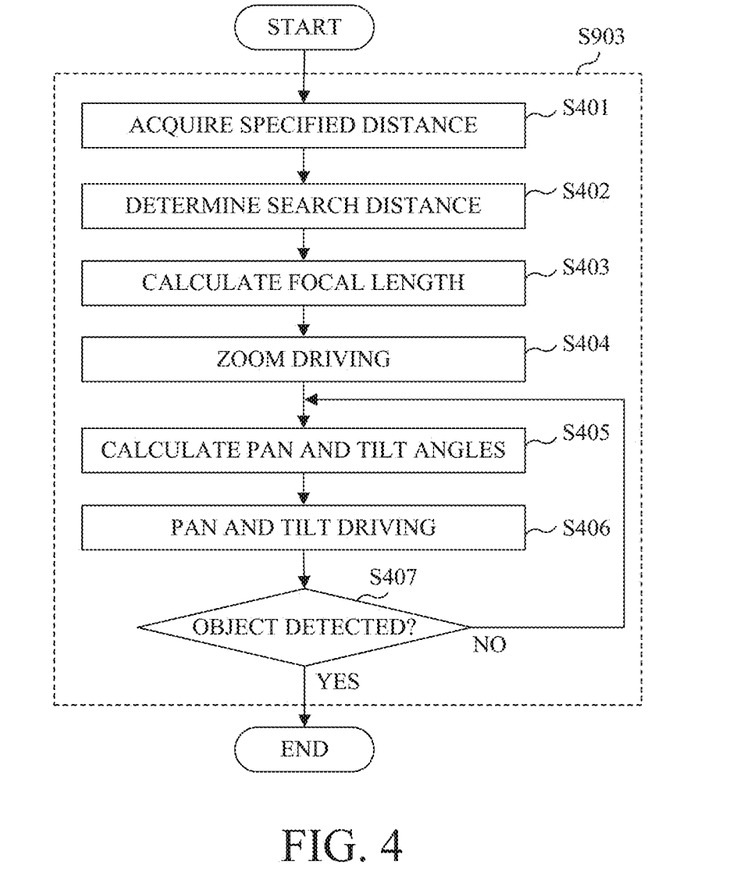
FIG. 4 is a flowchart illustrating a search sequence according to the first embodiment.

A flowchart in FIG. 4 illustrates details of the search sequence executed in step S903. As described above, the search sequence is a sequence that searches for an object based on a specified distance.

The control unit 207 first acquires the specified distance set by the search distance setting unit 208 in step S401 prior to the object search.

Next, in step S402, the control unit 207 determines the search distance based on the specified distance. The search distance corresponding to the specified distance is predetermined as 1 m for "short distance," 5 m for "middle distance," and 10 m for "long distance." At this time, the conversion from the specified distance to the search distance may be made with a previously prepared conversion table. Alternatively, the user may specify a search distance value, or dynamically change the conversion value to the search distance according to another setting.

Next, in step S403, the control unit 207 substitutes the search distance and the size of the search target object (face) for Equation (1) to calculate the focal length, and performs zooming of the lens unit 201 to acquire the focal length in step S404. This processing allows the object to be captured at an ideal size suitable to detect the object at the search distance.

The next steps S405 to S407 are detection cycles for comprehensively detecting an object in a searchable distance range while periodically changing the orientation of the imaging unit 101 by pan and tilt driving. The control unit 207 first calculates the target orientation (pan and tilt angles) of the imaging unit 101 in step S405, and performs pan and tilt driving so that the imaging unit 101 has the target orientation in step S406. Then, in step S407, the control unit 207 (object detector 209) detects an object in the captured image after pan and tilt driving is performed. In a case where no object is detected, the flow returns to step S405 to execute the next detection cycle. In a case where an object is detected, as described above, the object information indicating whether the object is a priority object or a non-priority object is stored, and this sequence ends.

An example of the calculation of the pan and tilt angles in step S405 will be described. Hereinafter, pan and tilt angles will be described as (pan angle, tilt angle). Assume a case where an object is not detected and step S404 is executed again via steps S405 and S406 each time the pan and tilt angles are calculated. The search range in this embodiment is ±120 degrees and 0 to 90 degrees for the pan angle and tilt angle, respectively.

First, the orientation (initial pan and tilt angles) of the imaging unit 101 is set to the minimum value of the search range (−120 degrees, 0 degrees). Thereafter, control unit 207 adds 1 degree to the pan angle, and pans the imaging unit 101 to (120 degrees, 0 degrees).

In a case where the pan angle reaches 120 degrees, which is the upper limit of the search range, the imaging unit 101 is returned to (−120 degrees, 0 degrees), then the control unit 207 adds 1 degree to the tilt angle and the pan angle while the imaging unit 101 is tilted to (−120 degrees, 1 degree). Thereafter, whenever the pan angle reaches 120 degrees and is reset to −120 degrees, the control unit 207 adds 1 degree to the tilt angle. Thus, in a case where the tilt angle reaches 90 degrees, which is the upper limit of the search range, the pan and tilt angles are returned to the initial (−120 degrees, 0 degrees). Thus, the object detection while the pan and tilt angles are periodically changed can comprehensively search for an object within the search range.

Figure 5:
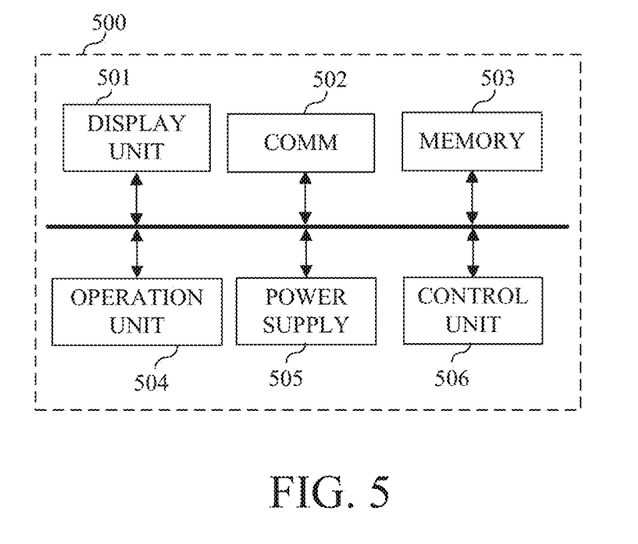
FIG. 5 is a block diagram illustrating the configuration of each of the image processing apparatuses according to the first and second embodiments.

FIG. 5 illustrates the configuration of an image processing apparatus 500 separate from the camera 100. The image processing apparatus 500 includes a personal computer, a smartphone terminal, or the like.

The image processing apparatus 500 includes a control unit 506, a memory 503, a display unit 501, an operation unit 504, a power supply unit 505, and a communication unit 502. The control unit 506 controls the entire image processing apparatus 500 according to a control program stored in the memory 503. The memory 503 stores various information such as parameters required for the control program and communication.

The power supply unit 505 supplies power to each unit in the image processing apparatus 500. The display unit 501 has a display device such as an LCD or an LED that displays information, and a speaker that can output sound. The operation unit 504 has operation members such as a button for accepting an operation by the user. In a case where the image processing apparatus 500 is a smartphone terminal, the display unit 501 and the operation unit 504 include a touch panel.

The image processing apparatus 500 communicates data and commands with the camera 100 via the communication unit 502. The data include audio data, image data, compressed audio data, and compressed image data. The commands include a setting change request, a data transmission request, a command response request, etc. from the image processing apparatus 500 to the camera 100. The communication uses a wireless LAN conforming to the IEEE802.11 standard series or Bluetooth Low Energy (BLE) (registered trademark).

The (search) control apparatus configured in the camera 100 may be provided in the image processing apparatus 500, or may be provided as a separate device from the camera 100 and the image processing apparatus 500. In this case, the control apparatus acquires image data from the camera 100 (imaging unit 201) through communication.

Figure 6:
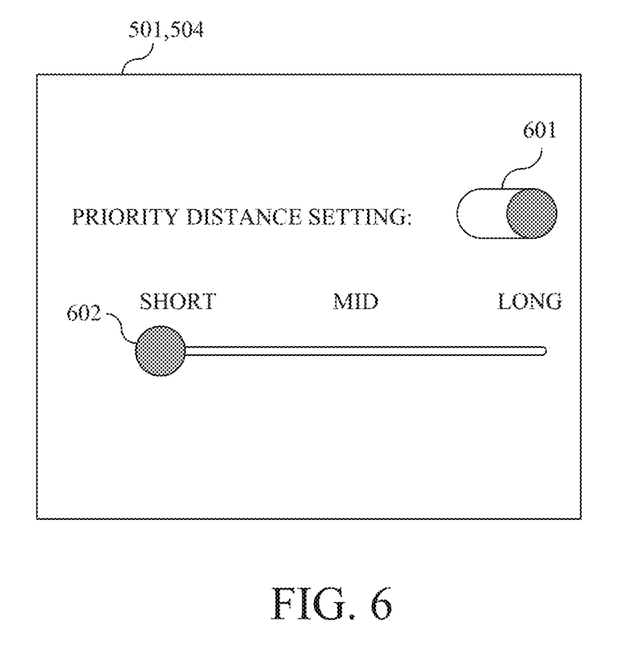
FIG. 6 illustrates a search distance setting user interface (UI) in the first and second embodiments.

FIG. 6 illustrates a user interface (UI) as a search distance setting unit provided through the display unit 501 (operation unit 504) of the image processing apparatus 500. This search distance setting UI is provided as part of an application for operating the camera 100. The search distance setting UI includes a priority distance setting button 601 for allowing the user to select whether or not to set a search distance (specified distance) for preferential search, and a distance selecting bar 602 that enables the user to select a specified distance from among the "short distance," the "middle distance," and the "long distance." In a case where the priority distance setting button 601 is turned off (disabled), the specified distance is specified as "automatic." In a case where the priority distance setting button 601 is turned on (enabled), the distance selecting bar 602 enables the election of the specified distance. Information about the specified distance that has been set is transmitted to the camera 100 via the communication unit 502. The camera 100 stores the received specified distance in the search distance setting unit 208.

Figure 7A:
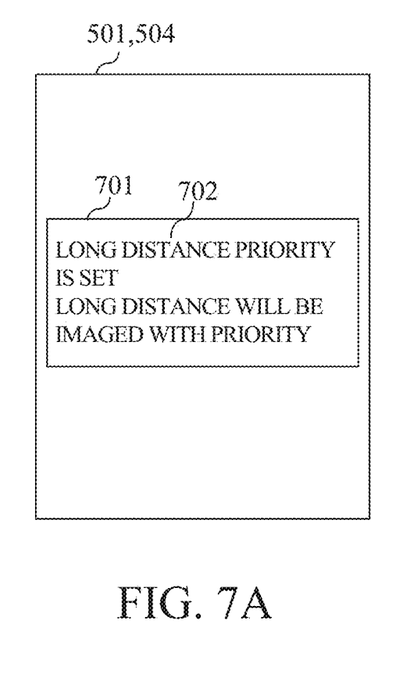
FIGS. 7A and 7B explain user notification on priority distance setting in the first and second embodiments.
Figure 7B:
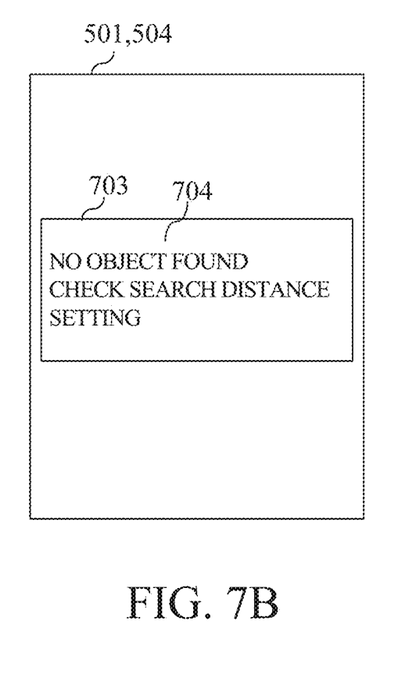

FIGS. 7A and 7B illustrate an example of the notification to the user displayed on the image processing apparatus 500 according to the search distance setting. The image processing apparatus 500 displays notifications 701 and 703 corresponding to notification commands issued by the camera 100 on the display unit 501 via the communication unit 502.

FIG. 7A illustrates the notification 701 that informs the user that the search distance has been set (the specified distance has been specified). This notification 701 notifies by text 702 the user that the search distance (long distance in the drawing) is set. In a case where the image processing apparatus 500 has activated a dedicated application, the notification 701 is displayed within that application. In a case where the image processing apparatus 500 has not activated a dedicated application, it is displayed in a notification area provided by the operating system of the image processing apparatus 500. For example, in a case where the image processing apparatus 500 is a smartphone terminal installing an operating system such as Android or iOS, it is displayed in the notification area provided by the operating system. This is similarly applied to the notification 703, which will be described below.

The camera 100 issues a notification command in a case where the user effectively sets the search distance just after the search distance setting is changed by the user, or just after the camera 100 is powered on or returned from the sleep state. The image processing apparatus 500 may display the notification 701 in a case where the search distance is effectively set by the user.

FIG. 7B illustrates the notification 703 prompting the user to review the search distance setting in a case where an object cannot be detected despite searching for an object at the search distance for a predetermined time. The notification 703 includes text 704 informing the user that the object cannot be detected. The camera 100 issues a notification command for causing the image processing apparatus 500 to display the notification 703 in a case where a predetermined time (for example, 10 minutes) of the search sequence has passed while no object has been detected and the search distance is effectively set by the user.

These notifications may be output as sound from the speaker of the display unit 501 of the image processing apparatus 500, or output as an image or sound from the unillustrated display unit or sound output unit provided in the camera 100.

According to this embodiment, the camera 100 that comprehensively searches the search range while changing the orientation (imaging direction) of the imaging unit 101 can detect an object existing in a wide search range in a short time.

In this embodiment, the imaging direction is changed by a mechanical PTZ mechanism, but the imaging direction may be electronically changed by clipping processing from the captured image.

In this embodiment, "automatic" can be selected as one of the specified distances, but the specified distance may be always selected from the "short distance," the "middle distance," and the "long distance." In this case, steps S901 and S902 of FIG. 9 may be deleted, and the search sequence of step S903 may be executed after the automatic imaging processing is started.

In this embodiment, the search distance setting UI includes the priority distance setting button 601 and the distance selecting bar 602. Alternatively, a distance selecting button such as a "long distance priority button" may be provided, or the specified distance may be alternately switched between "long distance" and "automatic" whenever the distance selecting button is operated. A specific numerical value may be input as the specified distance. A plurality of specified distances may be selected.

The camera 100 and the image processing apparatus 500 may communicate via a wired connection such as USB connection. The camera 100 and the image processing apparatus 500 may be integrated and they may communicate with each other via an internal bus etc.

In this embodiment, a human face is detected as an object, but part such as a human eye and hand, or the whole body may also be detected. An animal such as a dog and a cat, and a vehicle such as a car and an airplane may also be detected.

Second Embodiment

A second embodiment will discuss a search sequence developed from the search sequence (step S903) described in the first embodiment. In the first embodiment, only the specified distance specified by the user is searched. In a case where the distance to the object is fixed to some extent, such as in capturing a sports scene, the object can be imaged by searching for the specified distance using the search sequence of the first embodiment. However, in a case where a distance to an object changes over time or temporarily fluctuates significantly, as in imaging in a large area such as a park, or the object has a large moving amount in the distance direction, an object having a large moving amount may not be detected only by searching the specified distance. In this situation, the second embodiment preferentially searches for a specified distance and also searches for other distances to increase the object detection rate. The configurations of the camera and the image processing apparatus according to this embodiment are similar to those of the first embodiment. The tracking sequence and imaging sequence in a case where an object is detected are similar to those of the first embodiment.

Figure 8:
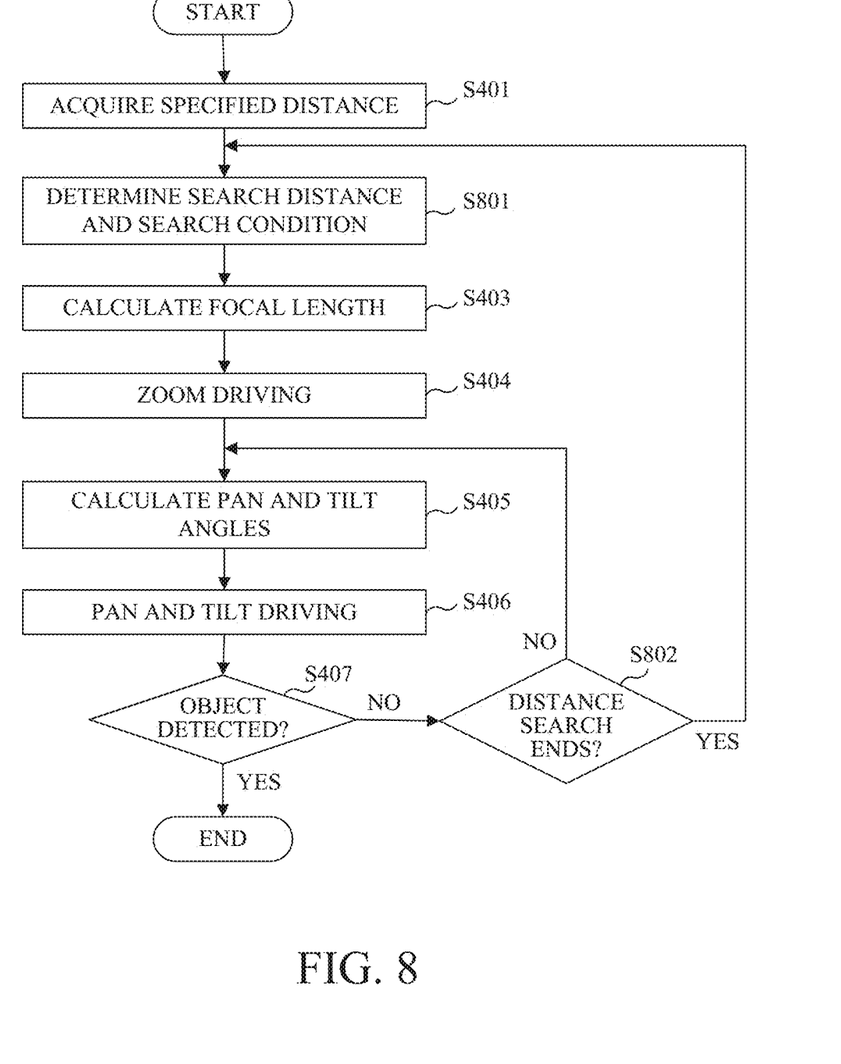
FIG. 8 is a flowchart illustrating a search sequence according to the second embodiment.

A flowchart of FIG. 8 illustrates a search sequence in this embodiment, step S402 in the search sequence illustrated in FIG. 4 is replaced with step S801, and step S802 is added to the search sequence illustrated in FIG. 4. In step S801, the control unit 207 determines a search distance and a search condition for that search distance. In step S802, it is determined whether or not the search termination condition included in the search condition determined in step S801 is satisfied. After a search is made at a search distance corresponding to the specified distance in steps S801 and S802, a search is performed in a search range including distances other than the specified distance by repeating searches at different search distances. A detailed description will now be given of steps S801 and S802.

The control unit 207 that has acquired the specified distance in step S401 determines the search distance and the search condition for that search distance in step S801. The search distance and search condition are determined using tables illustrated in FIGS. 10 and 11, which will be described below. The search distance is a value obtained by converting the specified distance acquired in step S401 into a specific distance. The search condition includes the pan and tilt driving amounts per cycle of object detection determined based on the search distance (that is, the orientation of the imaging unit 101), the object search time (search time), and the pan and tilt angle ranges for the object search (search ranges). The search termination condition is that the object cannot be detected within the search time or within the predetermined search amount.

In step S403, the control unit 207 calculates the focal length using Equation (1) based on the search distance determined in step S801.

Next, in step S404, the control unit 207 calculates the pan and tilt angles based on the pan and tilt driving amounts and the search range as the search condition determined in step S801.

In a loop of steps S405, S406, S407, and S802, an object detection cycle is executed at the search distance determined in step S801. In a case where the search termination condition is satisfied without detecting an object in step S802, the flow returns to step S801 to again determine the search distance and search condition and perform the search.

The search distance and search condition in step S801 are determined on the assumption that the search distance corresponding to the specified distance is preferentially searched and other distances are exhaustively searched. More specifically, the search condition is determined such that the search at the specified distance is performed for a sufficiently long time (first time), and the search at another distance is performed for a short time (second time).

Figure 10:
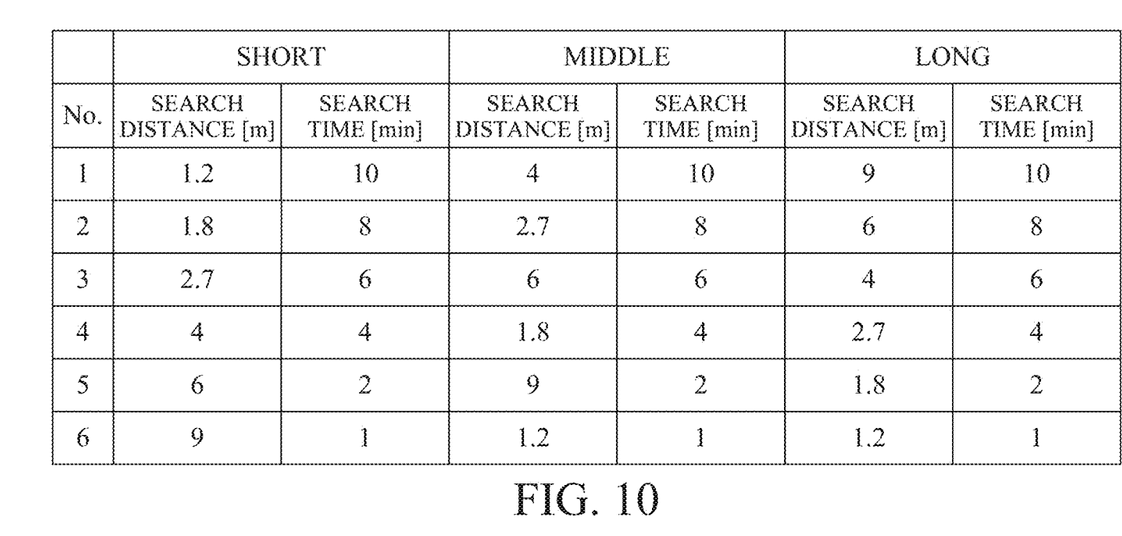
FIG. 10 illustrates a search distance and search time according to a specified distance in the second embodiment.

The table in FIG. 10 is used in step S801 in FIG. 9 and illustrates the correspondence between the search distance and the search time that is the search termination condition for each specified distance. No. 1 in this table illustrates the search distance and the search time for each specified distance. No. 2 to No. 6 illustrate the search distance and the search time that are sequentially searched after the search of No. 1.

In step S801, the control unit 207 searches a search distance of No. 1 corresponding to the specified distance for the search time. In a case where the search time of No. 1 passes while no object is detected, the flow returns from step S802 to step S801, and the control unit 207 searches a search distance of the next No. 2 for the search time. In a case where the search time of No. 2 passes while no object is detected, the flow returns from step S802 to step S801, and the control unit 207 searches a search distance of No. 3 for the search time. Thus, the control unit 207 continues the search while changing the search distance and search time until the object is detected. In a case where no object is detected even after the control unit 207 searches the search distance of No. 6 for the search time, the control unit 207 may again search the search distance of No. 1.

Figure 11:
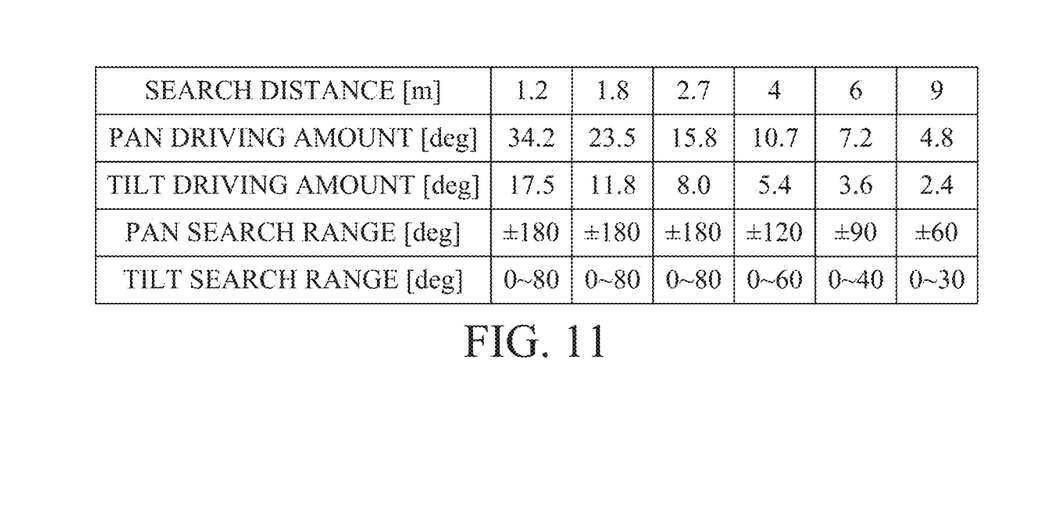
FIG. 11 illustrates pan and tilt driving amounts and pan and tilt search ranges according to the search distance in the second embodiment.

The table in FIG. 11 illustrates a pan driving amount, a tilt driving amount, a pan search range, and a tilt search range as the search condition for each search distance. The pan driving amount and the tilt driving amount are used in a case where the control unit 207 calculates the pan and tilt angles in step S405 of FIG. 9. The pan search range and the tilt search range indicate the pan and tilt driving ranges in the search at the search distance. In the detection cycle of steps S405 to S802, the control unit 207 sequentially changes the pan and tilt angles so that they fall within the pan and tilt search ranges.

The calculation of the pan and tilt angles in step S405 will be described using a search distance of 9 m as an example. Again, pan and tilt angles will be described as (pan angle, tilt angle). A description will now be given of a case where no object is detected for each detection cycle and the flow returns to step S405 via steps S406, S407, and S802 whenever the pan and tilt angles are calculated in step S405.

In a case where the search distance is 9 m, the pan search range is ±60 degrees and the tilt search range is 0 to 30 degrees, as illustrated in FIG. 11. Therefore, the control unit 207 first sets the orientation of the imaging unit 101 to (−60 degrees, 0 degrees). Next, the control unit 207 adds the pan driving amount of 4.8 degrees to the pan angle and drives the imaging unit 101 to (−55.2 degrees, 0 degrees).

Thereafter, the control unit 207 adds 4.8 degrees each to the pan angle and sequentially drives the imaging unit 101 up to (60 degrees, 0 degrees). In a case where the pan angle reaches 60 degrees, which is the upper limit of the pan search range, the control unit 207 adds the tilt driving amount of 2.4 degrees to the tilt angle, and drives the imaging unit 101 to (60 degrees, 2.4 degrees). At this time, the control unit 207 sets a flag to set the subtraction to the subsequent pan angle calculation. Next, the control unit 207 subtracts 4.8 degrees from the pan angle based on this flag, and drives the imaging unit 101 to (55.2 degrees, 2.4 degrees). Subsequently, the control unit 207 subtracts 4.8 degrees each from the pan angle. In a case where the pan angle reaches −60 degrees, which is the lower limit of the pan search range, the control unit 207 adds 2.4 degrees to the tilt angle and drives the imaging unit 101 to (−60 degrees, 5.8 degrees). Subsequently, the control unit 207 adds 4.8 degrees each to the pan angle. In a case where the pan angle reaches 60 degrees, which is the upper limit of the pan search range, the control unit 207 adds 2.4 degrees to the tilt angle and drives the imaging unit 101 to (60 degrees, 7.2 degrees). Thus, in a case where the tilt angle reaches 30 degrees, which is the upper limit of the tilt search range, through the addition and subtraction of pan angles and the addition of tilt angles, the pan and tilt angles are returned to the initial values of (−60 degrees, 0 degrees).

In step S801 where the tracking sequence (step S905) and the imaging sequence (step S906) illustrated in FIG. 9 end and the flow returns to the search sequence (step S903), the control unit 207 changes a determining method of the search distance and the search condition based on the stored object information. More specifically, in a case where the stored object information relates to a non-priority object, the control unit 207 takes over the search distance and search condition in the already performed object search, and resumes the object search from where it left off. On the other hand, in a case where the stored object information relates to a priority object, the control unit 207 resets the search distance and search condition in the already performed object search, and restarts the object search from the initial state. Thereby, the control unit 207 can temporarily capture an image of the non-priority object in a case where the non-priority object is detected, while comprehensively searching for the priority object within the search range.

A description will now be given of the six search distances illustrated in FIGS. 10 and 11. This embodiment sets the searchable distance range to 1 to 10 m, and uses these six search distances so as to surely detect any objects within this range with a smaller number of distance ranges. Setting the focal length of the lens unit 201 to a certain search distance and performing object detection using the captured image at that time can detect not only an object present at the search distance but also nearby objects. For example, in a case where a face size of an object on a captured image enough to detect the object with sufficient accuracy is 160 to 360 pixels in the short-side direction, the search distance is set to 1.2 m, and the focal length is set such that the face size of the object on the captured image is 300 pixels. At this time, an object located at a distance between 1 m and 1.5 m is detectable. Similarly, in a case where the search distance is 1.8 m, an object located at a distance between 1.5 m and 2.25 m is detectable. Thus, since the object distance detectable at a given focal length has a range, the search time can be shortened by selecting search distances so that their ranges do not overlap each other.

A detailed description will be given of the pan driving amount and tilt driving amount illustrated in FIG. 11. The pan and tilt driving amounts indicate changing amounts of the pan and tilt angles of the imaging unit 101 for each cycle in the object detection. In a case where the pan and tilt driving amounts are too large, the object may not be captured within the imaging angle of view, the detection may fail. On the other hand, in a case where the pan and tilt driving amounts are too small, the object can be surely detected, but the search time becomes long because the number of detection cycles for the search range increases. Even if an object is captured within the imaging angle of view, if the object is cut off at the edge of the captured image, the object cannot be detected with high accuracy. It is thus necessary to set the pan and tilt driving amounts so that the captured images partially overlap each other in the two consecutive detection cycles.

In a case where the captured image is a VGA (640×480 pixels) image, this embodiment controls the object size to 300 pixels on the captured image. Assume that an object has a circular face shape. Then, the object appears as a circle with a diameter of 300 pixels on the captured image. In order to capture this circle without disconnection at the edge of the image, it is sufficient that the pan driving amount is within ½ of the lateral width of the captured image and the tilt driving amount is within ⅓ of the vertical width of the captured image. Hence, as illustrated in FIG. 11, this embodiment sets the pan driving amount to ½ of the imaging angle of view at each focal length, and the tilt driving amount to ⅓ of the imaging angle of view at each focal length.

A description will now be given of the pan search range and tilt search range illustrated in FIG. 11. This embodiment limits the pan search range as the search distance becomes longer. In a case where an object moves within a certain range, as an object is located farther, a panning angle that covers the moving range becomes narrower. Therefore, limiting the pan search range enables an object in a target range to be more easily detected. On the other hand, in a case where the object is located near the camera 100, a wide-angle search is required for the moving amount of the object. Therefore, this embodiment does not limit the pan search range and comprehensively searches a searchable range.

The tilt search range is limited as the search distance increases. This is to match the face position of the person standing at that distance. More specifically, the tilt search range is limited according to the general human height. However, in a short distance, the position of the camera 100 and the variations in people are so influential that a wide tilt search range can be searched.

As described above, this embodiment preferentially searches for an object with a search distance corresponding to the specified distance, and also searches for objects at different distances. Thereby, this embodiment can detect even an object with a large moving amount in a short time.

A detector may be provided that detects whether the image pickup apparatus is held by the user or placed on a fixed member to detect a change in the installation position of the camera, to reset the search distance selection of the search sequence (step S903) and to again search a range from No. 1 in FIG. 10. Different search distance determination methods may be used between the hand-held state and the installation state on the fixed member. For example, a non-specified distance may be searched in addition to the specified distance in the installation state on the fixed member, and only the specified distance may be searched in the hand-held state.

In a case where "automatic" is set to the specified distance, the flow of FIG. 9 proceeds from step S901 to the automatic search sequence S902, but step S903 may be always executed by removing steps S901 and S902. In this case, the search distance and the search condition determined in step S801 are set so as to comprehensively search the entire search range.

Each embodiment can detect an object within a search range in a short time.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-047112, filed on Mar. 23, 2022, which is hereby incorporated by reference herein in its entirety.

What is claimed is:

1. A control apparatus comprising:
at least one processor; and
a memory storing instructions that, when executed by the at least one processor, configure the at least one processor to:
perform object searching using image data that has been acquired from an image pickup apparatus;
control the search by controlling a focal length of the image pickup apparatus according to a specified search distance in a search distance range where object search is available, and a size of a searched target object; and perform the object search at a search distance different from the specified search distance after performing the object search at the specified search distance for a search time.

2. The control apparatus according to claim 1, wherein the size of the searched target object includes an actual size of the searched target object and an imaging size of the search target object.

3. The control apparatus according to claim 2, wherein the searched target object is a human face, and
wherein the actual size is a size corresponding to a representative value of a length of the human face.

4. The control apparatus according to claim 1, wherein in a case where the object search at the specified search distance ends, perform the object search at a search distance different from the specified search distance.

5. The control apparatus according to claim 1, wherein execution of the stored instructions further configures the at least one processor to determine the search time according to the search distance for the object search.

6. The control apparatus according to claim 5, wherein execution of the stored instructions further configures the at least one processor to determine the search distance and the search time condition for a next object search based on the search distance and the search time for the object search that has already been performed.

7. The control apparatus according to claim 6, wherein execution of the stored instructions further configures the at least one processor to controls the search so that the search time for the object search at the search distance different from the specified search distance is shorter than that for the object search at the specified search distance.

8. The control apparatus according to claim 1, wherein execution of the stored instructions further configures the at least one processor to set the search distance to an initial value at least one of where a predetermined time has elapsed after the search distance is specified and where power of the image pickup apparatus is shut down.

9. The control apparatus according to claim 1, wherein execution of the instructions further configure the at least one processor to notify a user in at least one of cases where the search distance is specified, where the search distance is changed, and where an object is not detected in the object search for a predetermined time.

10. The control apparatus according to claim 1, wherein execution of the stored instructions further configures the at least one processor to, in a case where an object detected by the object search is a specific object, cause the image pickup apparatus to track the specific object.

11. An image pickup apparatus comprising:
an imaging unit configured to capture an object; and
a control apparatus,
wherein the control apparatus includes:
at least one processor; and
a memory storing instructions that, when executed by the at least one processor, configure the at least one processor:
a perform object searching using image data that has been acquired from an image pickup apparatus;
control the search by controlling a focal length of the image pickup apparatus according to a specified search distance in a search distance range where object search is available, and a size of a searched target object; and
perform the object search at a search distance different from the specified search distance after performing the object search at the specified search distance for a search time.

12. A control method comprising the steps of:
performing object search using image data that has been acquired from an image pickup apparatus; and
controlling the object search,
wherein the controlling step controls a focal length of the image pickup apparatus according to a specified search distance in a search distance range in which the object search is available, and a size of a searched target object and
performs the object search at a search distance different from the specified search distance after performing the object search at the specified search distance for a search time.

13. A non-transitory computer-readable storage medium storing a program for causing a computer to execute processing according to the control method according to claim 12.

* * * * *